United States Patent [19]

Flair

[11] 4,274,207
[45] Jun. 23, 1981

[54] DIFFERENTIAL CHECKING HEAD

[75] Inventor: Henry J. Flair, Franklin Park, Ill.

[73] Assignee: Illinois Tool Works Inc., Chicago, Ill.

[21] Appl. No.: 166,208

[22] Filed: Jul. 7, 1980

[51] Int. Cl.³ .......................... G01B 5/20; G01B 7/28
[52] U.S. Cl. .......................... 33/179.5 R; 33/143 L; 33/149 J; 33/179.5 D
[58] Field of Search .................. 33/179.5 R, 179.5 D, 33/143 L, 149 J

[56] References Cited

U.S. PATENT DOCUMENTS

| | | | |
|---|---|---|---|
| 1,175,401 | 3/1916 | Barnes | 33/179.5 R |
| 2,381,975 | 8/1945 | Ernst | 33/179.5 R |
| 2,775,041 | 12/1956 | Pomernacki | 33/179.5 R |
| 2,906,030 | 9/1959 | Höfler | 33/179.5 R |
| 2,938,275 | 5/1960 | Höfler | 33/179.5 R |
| 3,397,459 | 8/1968 | Ehrhardt et al. | 33/179.5 R |
| 3,522,524 | 8/1970 | Smith et al. | 33/179.5 R |
| 3,774,313 | 11/1973 | Occhialini et al. | 33/179.5 R |
| 3,872,602 | 3/1975 | Kennedy et al. | 33/199 R |
| 3,922,792 | 12/1975 | Ito | 33/149 J |
| 3,950,858 | 4/1976 | Donner | 33/179.5 R |

FOREIGN PATENT DOCUMENTS 1557759 6/1969 France .

Primary Examiner—Willis Little
Attorney, Agent, or Firm—Glenn W. Bowen; Thomas W. Buckman

[57] ABSTRACT

A differential checking head for checking tooth-to-tooth spacing of evenly spaced toothed gears or for checking lead variations of helical gears is disclosed. The checking head includes a pair of sensing fingers which have contact portions that touch gear profiles at predetermined test points. One of the sensing fingers is mounted on an arm which is pivoted in a fixed frame and which carries a moveable sensor actuator. The other sensing finger is mounted on a second arm which is also pivoted on the fixed frame and which carries a moveable sensing element which engages the actuator that is secured to the first arm. Both of the sensing arms are returned to their initial positions by return springs; and a second sensor, or limit switch, may be actuated by the actuator that controls the first sensor. The checking head provides a differential reading dependent upon the relative motion of the two sensing arms. This reading occurs at a very slow rate even though both of the fingers may move over the gear being sensed at a fast rate. In this manner, a very slow and accurate minimum reading may be obtained which can be easily read or recorded.

11 Claims, 6 Drawing Figures

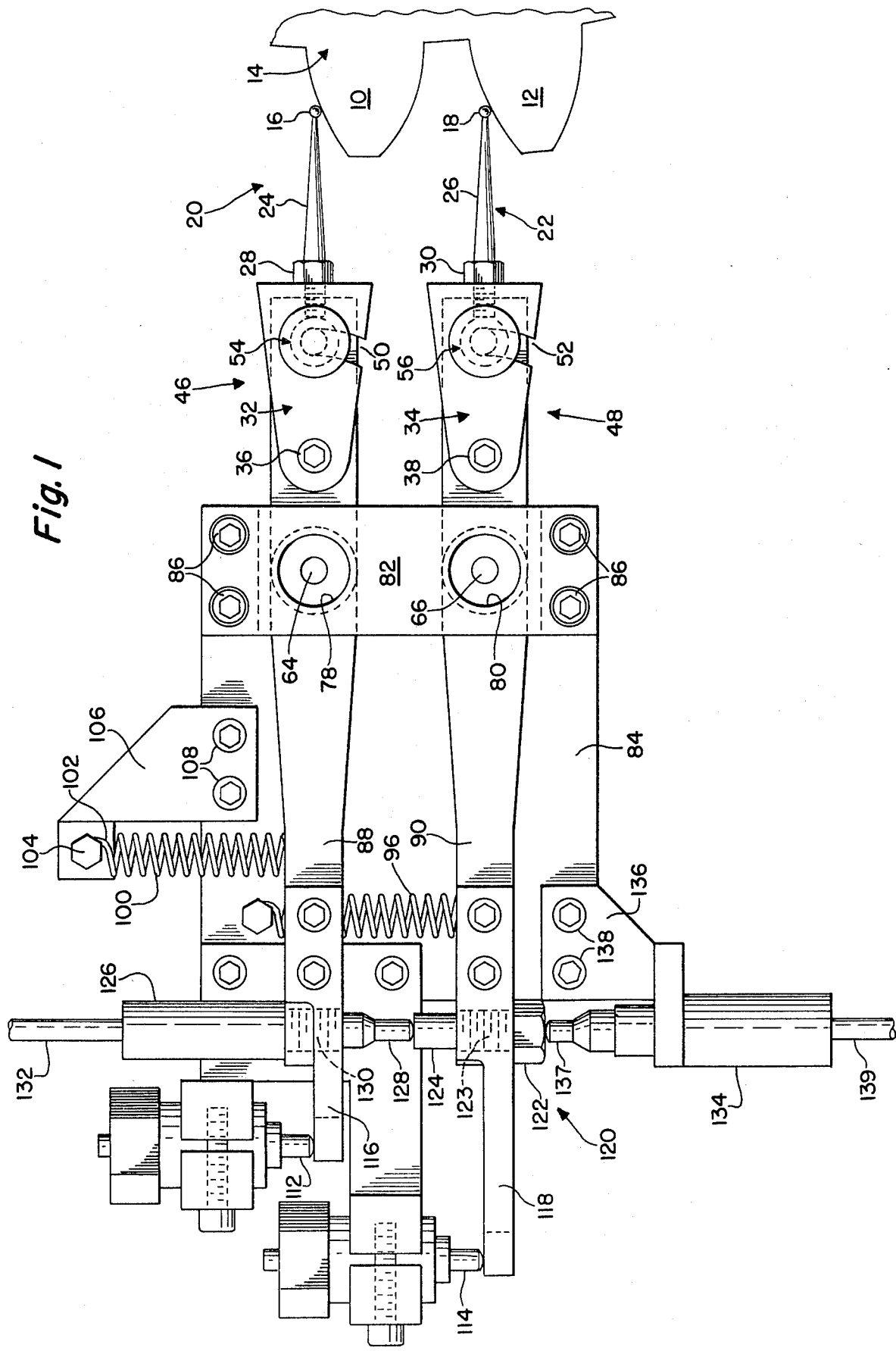

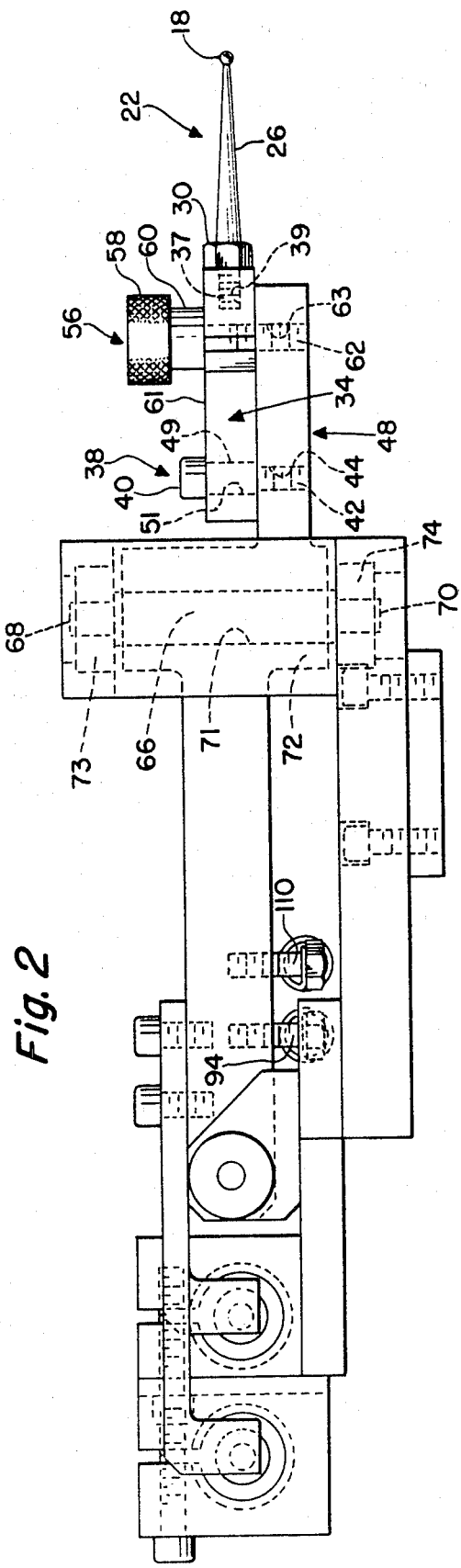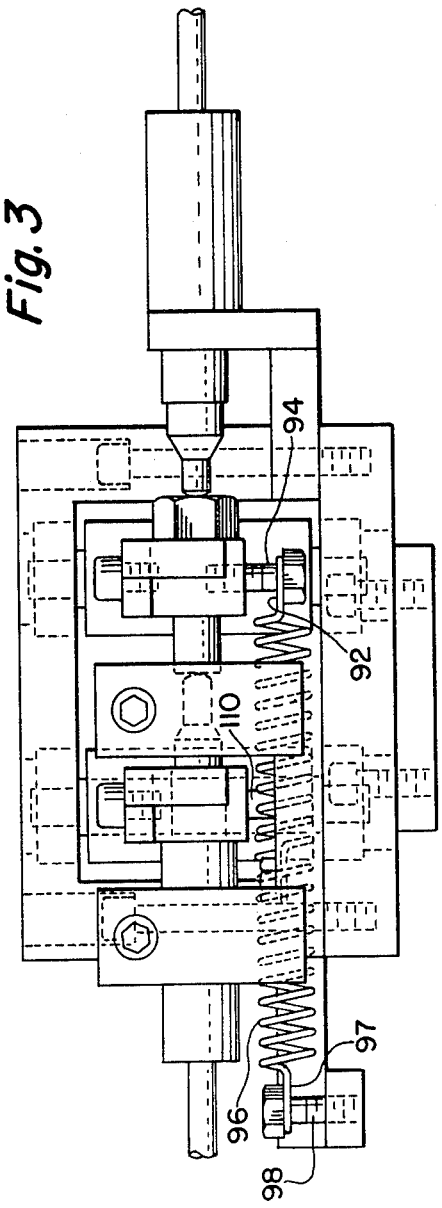

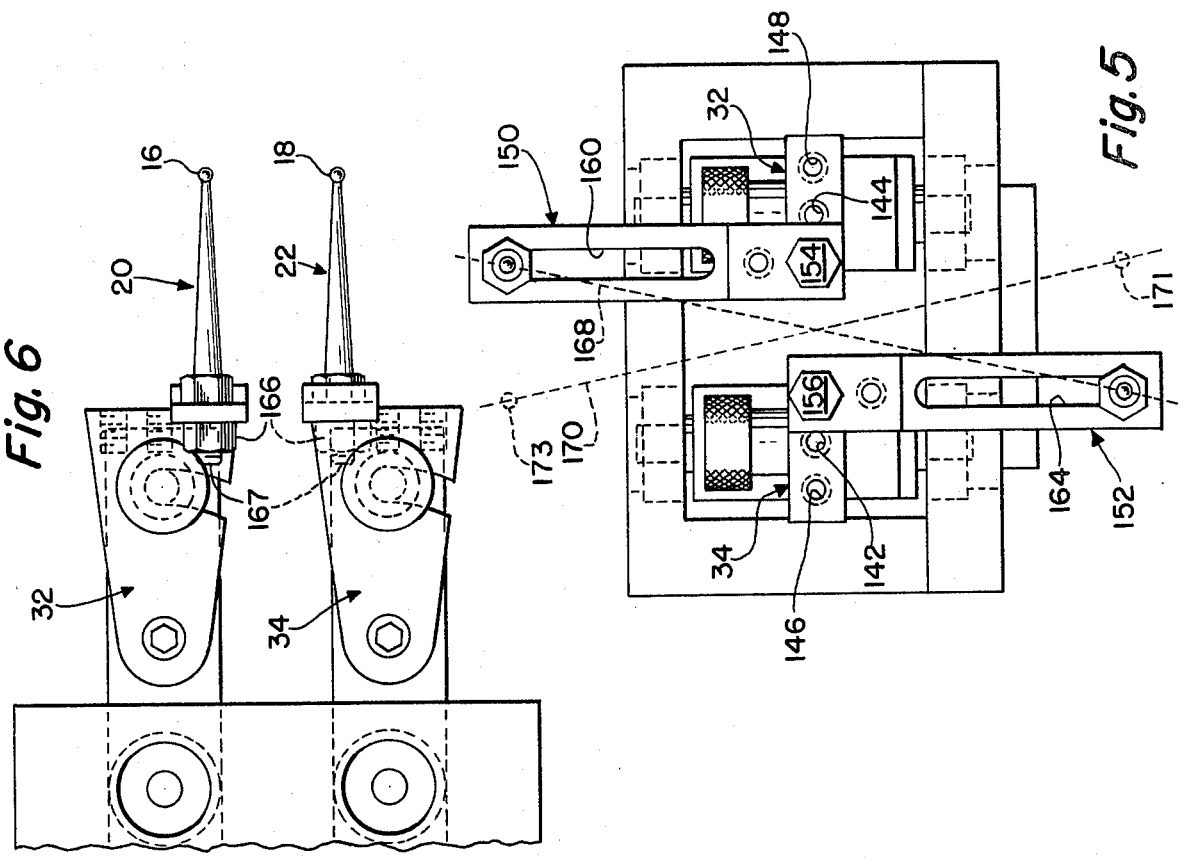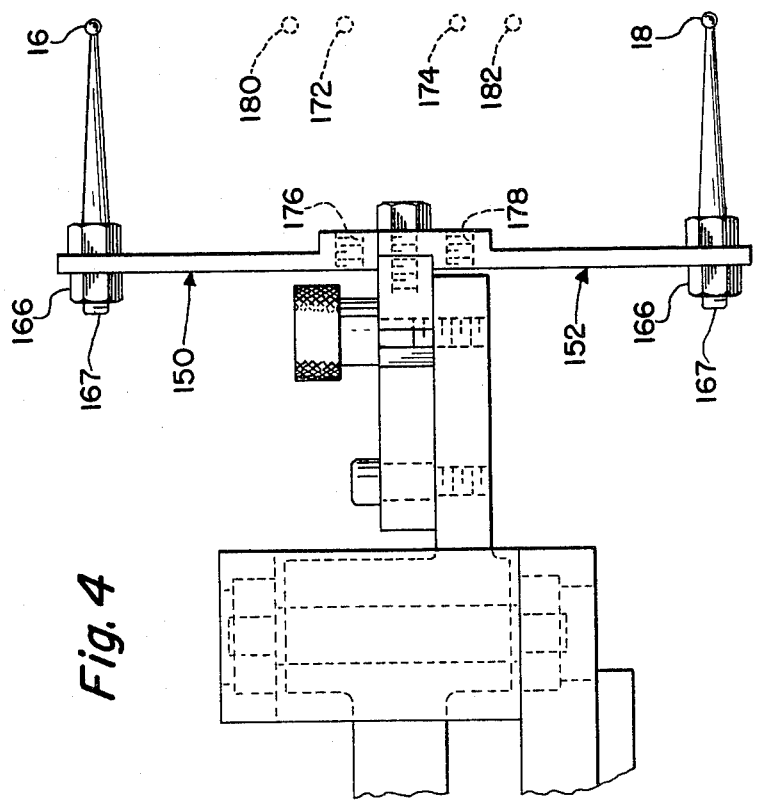

DIFFERENTIAL CHECKING HEAD

BACKGROUND OF THE INVENTION

Electronic differential checking heads are known in which two sensing fingers are connected to a pair of pivoted sensing arms, each of which controls a separate analog sensing element. In such a system, the sensing fingers move at a relatively fast rate while the gear rotates. This, in turn, produces two rapidly varying electrical signals at the output of the two sensors which are then coupled to a differential sensing amplifier to provide a difference signal. However, because the electrical signals are changing very rapidly, they cannot be visually read directly for verification purposes; and, in addition, these rapidly changing signals require relatively expensive circuitry to insure accuracy of the sensing system. In the present invention, a mechanical differential checking head is designed so that even though the sensing fingers move over the surface of the gear being tested at a very rapid rate, the difference in movement between the two sensing fingers provides a slowly changing signal that may be visually verified by a voltmeter to give an indication to the operator that the system is operating properly and in addition the slow movement provides a very accurate reading at a relatively low cost.

DESCRIPTION OF THE DRAWINGS

The present invention is described by reference to the drawings in which:

FIG. 1 is a top view of a tooth space checking head version of the present invention;

FIG. 2 is a side view of the space checking head of the present invention, with the stop members for the sensing arms being removed;

FIG. 3 is an end view of the space checking head of FIG. 1;

FIG. 4 is a view of an alternate version of a checking head of the present invention in which the two sensing fingers may sense two points on the same gear face;

FIG. 5 is an end view of the checking head of FIG. 4; and

FIG. 6 is a top view of a checking head of FIG. 4.

TECHNICAL DESCRIPTION OF THE INVENTION

The present invention is directed to a differential checking head which provides a difference signal between two sensing fingers in a manner such that a slow time-varying signal representative of the difference in motion of the two sensing fingers provides a checking signal of high accuracy, which signal may be verified visually simply by means of a meter connected to receive the difference signal. One version of the checking head, which is shown in FIGS. 1-3, may be employed to check external or internal gears, splines, and other evenly spaced toothed components whereby the tooth-to-tooth spacing may be checked with the checking head of the present invention. A second version of the checking head is shown in FIGS. 4-5, wherein the lead variation of a helical gear may be checked utilizing the same basic mechanism but with a different finger support holder, as will subsequently be described in more detail.

The operation of the tooth-to-tooth space checking head version of the present invention may be seen by reference to FIG. 1 in which two adjacent gear teeth 10, 12 of a spur gear 14 are contacted by the spherical tips 16, 18 of the sensing fingers 20, 22. The sensing fingers 20, 22 have a conical portion 24, 26 running from the sensing spherical tips 16, 18, and nut sections 28, 30 are integrally formed above the conical portions 24, 26. The nut sections 28, 30 are used to screw in the sensing fingers 20, 22 into internal threads on the finger supports 32, 34 at the ends of the sensing arms 46, 48, which is best shown in FIG. 2 where the sensing finger 22 has its external threaded portion 37 which is screwed into the internal threads 39 of the finger support 34.

The finger supports 32, 34 are pivotable about the securing bolts 36, 38. The bolts 36, 38 have a head 40 on them, as shown in FIG. 2, and a lower threaded portion 42 which which screws into internal threads 44 in the sensing arm 48 and an enlarged unthreaded section 49 between the head 40 and the threaded portion 42 in a somewhat larger passageway 5, which allows the finger support 34 to pivot about this section. Both of the finger supports 32, 34 are constructed in a similar manner and are provided with slots 50, 52 which allow the positions of the finger supports 32, 34 to be adjusted so the sensing tips 16, 18 may be moved closer to, or farther away from, each other, in accordance with the required checking requirements. The locking bolts 54, 56 are constructed with a head 58 and an enlarged diameter section 60 which serves to clamp down on the top surface 61 of the finger support 34 as the lower threaded portion 62 of the bolt is threaded into internal threads 63 in the moveable sensing arm 48.

The sensing arms 46, 48 are themselves pivotable about the pivot posts 64, 66, each of which is constructed with two threaded ends, such as the threaded ends 68, 70. The pivot post 66 passes through an opening 71 in a boss 72 formed on the sensing arm. The nuts 73, 74 are threaded onto the threaded ends 68, 70 to hold the pivot post 66 in place in the boss 72. The nuts 73, 74 are set in recesses 78, 80 in a supporting bridge 82 which is secured to the main frame 84 by the set screws 86.

The ends of the sensing arms 46, 48, remote from the sensing fingers, have tapered areas 88, 90; and spring posts 94, 110 are secured to the sensing arms just beyond the tapered areas 88, 90 to provide an engagement point for one end of a return spring 96, 100, as best shown in FIG. 3. One looped end 92 of the spring 96 engages the spring post 94 while the other looped end 97 of the spring 96 engages a spring post 98. The spring 100 is connected in a similar manner with one looped end 102 around the spring post 104 on the bracket 106, which is secured to the frame 84 by means of the set screws 108 and with the other looped end (not shown) of the spring 100 connected to the spring post 110 that extends below the tapered area 88 of the sensing arm 46. The springs 96, 100 therefore return the sensing arms 46, 48 to their initial position when they are no longer engaging a gear. This position is defined by the limit stops 112, 114 which engage the elongated extensions 116, 118 of the sensing arms 46, 48.

The differential sensing action of the present invention is obtained by mounting an actuator 120 on the sensing arm 48. The actuator 120 consists of an integrally formed nut head 122 and an internal threaded portion 123 which allows the actuator 120 to be secured to the arm 48. An actuator button 124 extends through the arm 48 toward the arm 46. The arm 46 carries a sensor 126 which preferably is a linear differential voltage transformer sensor which has an actuating pin 128 that engages the button 124. The sensor 126 is threaded into the arm 46 by means of the threaded portion 130. The wires 132 from the sensor 126 that extend from the sensor are allowed to be slack so that they may move freely with the sensor.

In operation, as the spherical tips 16, 18 move over the profile of the teeth 10 and 12, any difference between the two teeth is sensed by the sensor 126 due to the motion of the pin 128 as it interacts with the button 124. The motion of the pin 128, in turn, internally moves a magnetic slug which effects the signal coupled between the windings of a differential voltage transformer so as to obtain a differential output reading. However, since the only movement that is sensed is the difference in motion of the sensing tips 16, 18, and not their absolute movement, as it would be with a space checking head using an electronic means to obtain a differential reading, the output signal has a very slowly changing magnitude and may be used to obtain very accurate measurement. A volt meter may be connected to the output leads 132 of the sensor 126, and the meter will directly indicate a very slow, time-varying signal which may be used for operator verification of the operation of the checking head.

If desired, a second sensor 134 of the linear differential voltage transformer type may also be secured to the bracket 136 which is secured to the main frame 84 by means of the set screws 138. The sensor 134 would have an actuating pin 137 that contacts the head 122 of the actuator mechanism 120. The output leads 139 of the sensor may also be connected for reading or recording of the signal developed by the sensor 134.

As an alternative to a differential voltage transformer for the sensor 134, a limit switch having the same configuration, which will be actuated when the arm is fully returned to its initial position, may be used instead. Although it is preferable for both of the sensors 126 and 134 to be differential voltage transformer sensors in order to improve accuracy and provide a measure of redundancy, the alternate limit switch version will still provide an improved differential checking head which produces a slowly varying difference signal indication of the surface on the workpiece being checked. When two differential transformer sensors are employed, it is, of course, necessary for the nut head 122 to remain in contact with the actuator pin 137 and for the button 124 to remain in contact with the actuator pin 128 at all times during operation. However, when a limit switch is substituted for the sensor 134, it is only necessary for the nut head 122 to contact the pin 137 of the switch 134 sufficiently to close it, when the sensing arm 48 has been returned to initial position to give an indication to the control circuitry that the arm is back to its starting position.

In the operation of the space checking head shown in FIG. 1, it is mounted to a large gear checking machine in which the gear is slowly rotated until a minimum reading is obtained. After the minimum reading is obtained, a retracting device (not shown) will move the space checking heads so that both of the fingers move radially out of the gear tooth contact position. A timing device then gives a signal to the checking head to move radially into the next space to obtain the next reading. After all of the teeth have been checked, a signal is actuated to stop the head in the retracted position. In order to check opposite adjacent profiles, the gears may merely be driven in the opposite direction.

The same basic differntial checking head described with reference to FIGS. 1–3 may be used to check lead variation of the helical gears by employing the modifications shown in FIGS. 4–5. In the description of the embodiment of FIGS. 1–3, the sensing fingers 20, 22 were directly threaded into the finger supports 32, 34. In the versions shown in FIG. 1, the fingers are centered relative to the finger supports and thus they were screwed into the holes 142, 144 that are shown in FIG. 5. In addition to the centrally located holes, however, the finger supports 32, 34 of FIGS. 1–3 are each provided with two additional threaded holes such as the threaded holes 146, 148. Thus, there are three threaded holes for each finger support 32, 34 so that the sensing fingers 20, 22 may be screwed into either the center hole or in one of the holes to the left or right of the center hole for the version of either FIGS. 1–3 or the version of FIGS. 4–6.

In the version of the checking head shown in FIGS. 4–5, the sensing fingers 20, 22 are mounted on support brackets 150, 152. The support brackets 150, 152 are secured to the finger supports 32, 34 by the locking screws 154, 156, respectively, where the locking screw 154 is screwed into the threaded hole in the finger support 32 to the left of the center hole 144 and the locking screw 156 is screwed into the threaded hole in the finger support 34 to the right of the center hole 142. Although the support brackets 150, 152 are shown as being secured relative to these particular holes, it is not essential that they be so located, since any combination of threaded holes may be utilized, if desired, depending upon the checking requirements.

The support brackets 150, 152 are provided with elongated slots 160, 164 which allow for adjustment of the fingers 20, 22 in a vertical plane, as desired. When the finger is adjusted to a desired location, it will be locked into place by means of the nuts 166 which are secured on the threaded ends 167 of the sensing fingers. The sensing fingers 20, 22 may thus be located along a line such as the dotted line 168, which represents the contact line of the sensing tips 16, 18 when they are sensing the lead variation of a gear with a right-handed helix. If the lead variation of a gear with a left-handed helix is to be sensed, the fingers in the brackets will be remounted so that the sensing tips 16, 18 are lined along the dotted line 170 which runs through the dotted circles 171, 173 which represent the position of the tips 16, 18 for this measurement.

The vertical adjustment position of the tips 16, 18 shown in FIG. 4 is for a maximum face width. The minimum face width adjustment for the slots 160, 164 is indicated by the dotted circles 172, 174 which represent the location of the tips 16, 18 at this position. In order to measure the even smaller minimum face width represented by the dotted circles 172, 174, the fingers 20, 22 may be screwed into the threaded holes 176, 178.

What is claimed is:

1. A contact sensor for sensing workpiece profiles comprising a frame, first and second sensing fingers which contact said workpiece profile, first and second sensing arms pivotally mounted about first and second pivot points, respectively, which support said first and second sensing fingers, respectively, a first sensor secured to said first arm and having a moveable operating means, said first pivot point for said first sensing arm being located intermediate said first sensor and said workpiece and said second pivot means being located intermediate said operating means and said workpiece, actuator means secured to said second arm so that said actuator means remains in contact with said operating means as said sensing arms undergo pivotal motion in response to the motion of said sensing fingers on the workpiece profile which allows said sensor to develop an output signal that is representative of the differential motion of said sensing fingers, and resilient return means for returning said sensing arms to an initial position when said sensing fingers are removed from contact with said workpiece profile.

2. A contact sensor as claimed in claim 1 further comprising a second linear position sensor that is stationary relative to said frame and has a second moveable operating means which remains in contact with said actuator means on said second arm while said workpiece profile is being sensed.

3. A contact sensor as claimed in claim 1 further comprising a switch that is stationary relative to said frame and has a second moveable operating means which is engaged by said actuator means to actuate said switch when said second arm is returned to its initial position.

4. A contact sensor as claimed in claim 1 comprising first and second finger support holders, for supporting said first and second sensing fingers, respectively, said first support holder being pivotally mounted on said first sensing arm and said second support holder being pivotally mounted on said second sensing arm, locking means associated with each of said support holders for individually locking each of said support holders in at a desired pivotal position so that said sensing fingers are located at a spaced-apart distance in substantially the same plane which allows said sensing fingers to be used for checking the tooth-to-tooth spacing of gear teeth.

5. A contact sensor as claimed in claim 1 wherein said first and second support holders are formed with a plurality of support apertures therein which are capable of receiving a portion of said sensing fingers therein so that said spaced-apart distance of said sensing fingers may be established independently of the pivotable adjustment of said support holders by selective insertion of said sensing fingers into said support apertures.

6. A contact sensor as claimed in claim 5 further comprising a second linear position sensor that is stationary relative to said frame and has as second moveable operating means which remains in contact with said actuator means on said second arm while said workpiece profile is being sensed.

7. A contact sensor as claimed in claim 5 comprising first and second finger support holders, for supporting said first and second sensing fingers, respectively, said first support holder being pivotally mounted on said first sensing arm and said second support holder being pivotally mounted on said second sensing arm, locking means associated with each of said support holders for individually locking each of said support holders in at a desired pivotal position so that said sensing fingers are located at a spaced-apart distance in substantially the same plane which allows said sensing fingers to be used for checking the tooth-to-tooth spacing of gear teeth.

8. A contact sensor as claimed in claim 4 further comprising first and second finger support holders, said first support holder being pivotally mounted on said first sensing arm and said second support holder being pivotally mounted on said second sensing arm, locking means associated with each of said support holders for individually locking each of said support holders at a desired pivotal position, first and second elongated support brackets which extend in a direction normal to said first and second sensing arms, respectively, for supporting said sensing fingers at a spaced-apart distance, said first and second sensing fingers being adjustably secured to said first and second support brackets, respectively, so that adjustment of the positions of said first and second sensing fingers along their associated elongated support brackets enables said sensing fingers to be located in substantially the same diagonal plane which allows said sensing fingers to be used for checking the lead variation of gear helixes.

9. A contact sensor as claimed in claim 8 wherein said first and second support holders are formed with a plurality of support apertures therein and said first and second support brackets each comprise an elongated securing means each of which is received in one of said apertures so that the spaced-apart distance of said sensing fingers may be established independently of the pivotable adjustment of said support holders by selective insertion of said securing means into said support apertures.

10. A contact sensor as claimed in claim 9 further comprising a second linear position sensor that is stationary relative to said frame and has a second moveable operating means which remains in contact with said actuator means on said second arm while said workpiece profile is being sensed.

11. A contact sensor as claimed in claim 9 further comprising a switch that is stationary relative to said frame and has a second moveable operating means which is engaged by said actuator means to actuate said switch when said second arm is returned to its initial position.

* * * * *